(12) United States Patent
Yamamoto

(10) Patent No.: US 11,855,276 B2
(45) Date of Patent: Dec. 26, 2023

(54) ELECTRODE FOR SECONDARY BATTERY AND SECONDARY BATTERY

(71) Applicant: TOYOTA JIDOSHA KABUSHIKI KAISHA, Toyota (JP)

(72) Inventor: Yuji Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 104 days.

(21) Appl. No.: 17/382,928

(22) Filed: Jul. 22, 2021

(65) Prior Publication Data

US 2021/0351397 A1 Nov. 11, 2021

Related U.S. Application Data

(62) Division of application No. 16/525,817, filed on Jul. 30, 2019.

(30) Foreign Application Priority Data

Aug. 13, 2018 (JP) .................................. 2018-152283

(51) Int. Cl.
| | |
|---|---|
| *H01M 4/36* | (2006.01) |
| *H01M 4/38* | (2006.01) |
| *H01M 4/485* | (2010.01) |
| *H01M 4/62* | (2006.01) |
| *H01M 4/02* | (2006.01) |

(52) U.S. Cl.
CPC ............ *H01M 4/362* (2013.01); *H01M 4/386* (2013.01); *H01M 4/485* (2013.01); *H01M 4/625* (2013.01); *H01M 2004/021* (2013.01)

(58) Field of Classification Search
CPC ...... H01M 4/362; H01M 4/386; H01M 4/485; H01M 4/625; H01M 4/0404; H01M 4/13; H01M 4/131; H01M 4/133; H01M 4/134; H01M 4/505; H01M 4/525; H01M 4/587; H01M 4/624; H01M 4/626; H01M 2004/021; H01M 10/0525; Y02E 60/10
See application file for complete search history.

(56) References Cited

U.S. PATENT DOCUMENTS

| | | | |
|---|---|---|---|
| 2008/0280207 A1 | 11/2008 | Patoux et al. | |
| 2011/0281156 A1 | 11/2011 | Boren et al. | |
| 2014/0093769 A1* | 4/2014 | Busnaina | ............... H01M 4/366 29/623.1 |
| 2016/0099471 A1* | 4/2016 | Oh | ........................ H01M 4/663 429/223 |

(Continued)

FOREIGN PATENT DOCUMENTS

| | | |
|---|---|---|
| JP | 2009-521082 A | 5/2009 |
| JP | 2014-63714 A | 4/2014 |

(Continued)

*Primary Examiner* — Kiran Quraishi Akhtar
(74) *Attorney, Agent, or Firm* — Sughrue Mion, PLLC

(57) ABSTRACT

An electrode using a carbon nanotube as a conductive material, and excellent in resistance characteristics is provided. An electrode for a secondary battery herein disclosed has a collector, and an active material layer formed on the collector. The active material layer includes an active material and a carbon nanotube. At least a part of the surface of the carbon nanotube is coated with a material including an element with a lower electronegativity than that of carbon.

4 Claims, 3 Drawing Sheets

(56) References Cited

U.S. PATENT DOCUMENTS

| | | |
|---|---|---|
| 2016/0301066 A1 | 10/2016 | Ozkan et al. |
| 2017/0125817 A1 | 5/2017 | Yushin et al. |
| 2017/0148538 A1 | 5/2017 | Nishiura et al. |
| 2018/0301699 A1 | 10/2018 | Liang et al. |
| 2020/0052288 A1 | 2/2020 | Yamamoto |

FOREIGN PATENT DOCUMENTS

| | | |
|---|---|---|
| JP | 2015-53165 A | 3/2015 |
| JP | 2015-138633 A | 7/2015 |
| JP | 5906578 B2 | 4/2016 |
| JP | 6136788 B2 | 5/2017 |
| JP | 2017-95757 A | 6/2017 |
| JP | 2017-174612 A | 9/2017 |
| KR | 10-2016-0033638 A | 3/2016 |
| WO | 2017/101470 A1 | 6/2017 |

\* cited by examiner

ELECTRODE FOR SECONDARY BATTERY AND SECONDARY BATTERY

It should be noted that the present application is a divisional of U.S. patent application Ser. No. 16/525,817 filed on Jul. 30, 2019, which claims the benefit of priority based on Japanese Patent Application No. 2018-152283 filed on Aug. 13, 2018, the content of which is incorporated herein by reference in its entirety.

BACKGROUND OF THE INVENTION

1. Field of the Invention

The present teaching relates to an electrode for a secondary battery. The present teaching also relates to a secondary battery including the electrode.

2. Description of the Related Art

In recent years, a secondary battery such as a lithium ion secondary battery has been suitably used for a portable power source for a personal computer, a portable terminal, or the like; a vehicle driving power source for an electric vehicle (EV), a hybrid vehicle (HV), a plug-in hybrid vehicle (PHV), or other vehicles; or the like.

An electrode for use in a secondary battery such as a lithium ion secondary battery typically has a configuration in which an active material layer is provided on a collector. A technology of incorporating a conductive material into an active material layer in order to enhance the electron conductivity of the active material layer has been known.

Japanese Patent Publication No. 6136788 describes that use of a carbon nanotube in a small amount as a conductive material can improve the electron conductivity of the active material layer.

SUMMARY OF THE INVENTION

Further improvement in resistance characteristics such as a decrease in resistance has been required for secondary batteries such as lithium ion secondary batteries. For such a requirement, the present inventor has conducted intensive studies thereon, and as a result, the present inventor has found that, in the conventional art, a certain level of resistance reducing effect can be achieved by the electron conductivity improving effect due to carbon nanotubes, but there is still room for improvement of the resistance characteristics.

Under such circumstances, it is an object of the present teaching to provide an electrode using a carbon nanotube as a conductive material, and excellent in resistance characteristics.

The electrode for a secondary battery herein disclosed includes a collector, and an active material layer formed on the collector. The active material layer includes an active material and a carbon nanotube. At least a part of a surface of the carbon nanotube is coated with a material including an element with a lower electronegativity than that of carbon.

Such a configuration provides an electrode using a carbon nanotube as a conductive material, having a small initial resistance, and suppressed in an increase in resistance after high-temperature storage. Namely, an electrode using a carbon nanotube as a conductive material, and excellent in resistance characteristics is provided.

In accordance with one desirable aspect of the electrode for a secondary battery herein disclosed, the element with a lower electronegativity than that of carbon may be at least one selected from the group consisting of Ti, P, B, Si, Al, Zn, and W.

With such a configuration, the resistance characteristics improving effect becomes particularly high.

In accordance with one desirable aspect of the electrode for a secondary battery herein disclosed, the electrode for a secondary battery may be a positive electrode, and the active material may be a positive electrode active material.

With such a configuration, the initial resistance reducing effect becomes particularly high.

In accordance with one desirable aspect of the electrode for a secondary battery herein disclosed, the electrode for a secondary battery may be a negative electrode, and the active material may be $Li_4Ti_5O_{12}$ or Si.

With such a configuration, the initial resistance reducing effect becomes particularly high.

In accordance with one desirable aspect of the electrode for a secondary battery herein disclosed, the average length of the carbon nanotubes may be 3 μm or more and 50 μm or less.

With such a configuration, the resistance characteristics improving effect becomes particularly high.

In accordance with one desirable aspect of the electrode for a secondary battery herein disclosed, the coating ratio of the surface of the carbon nanotube with the material including an element with a lower electronegativity than that of carbon may be 40% or more and 70% or lower.

With such a configuration, the resistance characteristics improving effect becomes particularly high.

In accordance with one desirable aspect of the electrode for a secondary battery herein disclosed, the material including an element with a lower electronegativity than that of carbon may be an oxide of the element with a lower electronegativity than that of carbon.

With such a configuration, the element with a lower electronegativity than that of carbon becomes less likely to be eluted from the coating, resulting in an improvement of the durability of the coating.

The secondary battery herein disclosed includes the electrode for a secondary battery described above.

Such a configuration provides a secondary battery excellent in resistance characteristics (i.e., having a small initial resistance, and suppressed in an increase in resistance after high-temperature storage).

DESCRIPTION OF THE PREFERRED EMBODIMENTS

Embodiments of the present teaching will be described below. It should be noted that matters necessary for executing the present teaching, except for matters specifically referred to herein (e.g., a general configuration of an electrode not featuring the present teaching) can be recognized as design matters of those skilled in the art based on the related art in the present field. The present teaching can be executed based on the contents disclosed herein, and the technical common sense in the present field. Further, in the following accompanying drawings, the members and portions exerting the same function are given the same reference number and sign for description. Further, the dimensional relation (such as length, width, or thickness) in each drawing does not reflect the actual dimensional relation.

In the present description, "secondary battery" is a term denoting an electric storage device capable of repeatedly charging and discharging in general, and including so-called electric storage elements such as a storage battery and an electric double layer capacitor.

Hereinafter, an embodiment in which the electrode for a secondary battery herein disclosed is an electrode for a lithium ion secondary battery will be specifically described with reference to the accompanying drawings.

Figure 1:
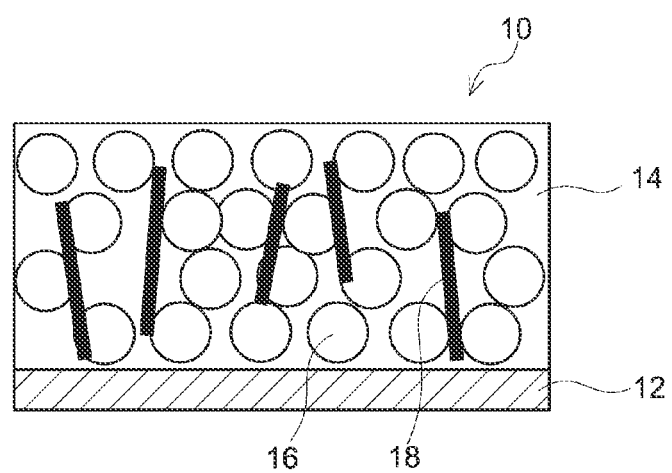
FIG. 1 is a schematic cross sectional view showing a part of an example of an electrode in accordance with one embodiment of the present teaching.

FIG. 1 is a schematic cross sectional view showing a part of the electrode in accordance with the present embodiment. As shown in FIG. 1, an electrode 10 in accordance with the present embodiment has a collector 12, and an active material layer 14 formed on the collector 12.

The collector 12 is typically a member made of a metal with good conductivity. As the collector 12, for example, a sheet-shaped member such as metal foil, a metal mesh, or a punching metal can be used.

When the collector 12 is a positive electrode collector, the collector 12 is desirably a member made of aluminum or aluminum alloy, and more desirably aluminum foil.

When the collector 12 is a negative electrode collector, the collector 12 is desirably a member made of copper or copper alloy, and more desirably copper foil.

The active material layer 14 includes an active material 16.

When the active material 16 is a positive electrode active material, examples thereof may include lithium transition metal oxides (e.g., $LiNi_{1/3}Co_{1/3}Mn_{1/3}O_2$, $LiNiO_2$, $LiCoO_2$, $LiFeO_2$, $LiMn_2O_4$, or $LiNi_{=0.5}Mn_{1.5}O_4$), and lithium transition metal phosphate compounds (e.g., $LiFePO_4$).

When the active material 16 is a negative electrode active material, examples thereof may include carbon materials such as graphite, hard carbon and soft carbon; lithium titanate ($Li_4Ti_5O_{12}$:LTO); and Si, and Sn.

Since the initial resistance reducing effect is particularly high, the electrode 10 in accordance with the present embodiment is desirably a positive electrode, and the active material 16 is desirably a positive electrode active material (particularly, a lithium transition metal oxide).

Because of the particularly high initial resistance reducing effect, desirably, the electrode 10 in accordance with the present embodiment is a negative electrode, and the active material 16 is LTO or Si.

It should be noted that the electrode 10 in accordance with the present embodiment herein described is for a lithium ion secondary battery, but when the electrode 10 is formed as an electrode for other secondary batteries, the kind of the active material may be appropriately selected.

The active material layer 14 includes a carbon nanotube 18.

As the carbon nanotube 18, for example, a single-walled carbon nanotube (SWNT) or a multilayer carbon nanotube (e.g., double-walled carbon nanotube (DWNT)), or the like can be used. These can be used singly, or in combination of two or more thereof.

The carbon nanotube 18 may be a product manufactured by an arc discharge method, a laser ablation method, a chemical vapor deposition method, or the like.

The average length of the carbon nanotubes 18 is not particularly restricted. When the average length of the carbon nanotubes 18 is short, the conductive path between the active materials tends to become less likely to be formed. For this reason, the average length of the carbon nanotubes 18 is desirably 1 µm or more, more desirably 2 µm or more, and further desirably 3 µm or more. Meanwhile, when the average length of the carbon nanotube 18 is large, the carbon nanotubes 18 are aggregated, and are not uniformly dispersed. Accordingly, the electron conductivity improving effect tends to be less likely to be obtained. For this reason, the average length of the carbon nanotubes 18 is desirably 100 µm or less, more desirably 75 µm or less, and further desirably 50 µm or less. Since the resistance characteristics improving effect is particularly high, the average length of the carbon nanotubes 18 is most desirably 3 µm or more and 50 µm or less.

The average diameter of the carbon nanotubes 18 is not particularly restricted, and is desirably 0.1 nm or more and 30 nm or less, and more desirably 0.5 nm or more and 20 nm or less.

The average length and the average diameter of the carbon nanotubes 18 can be determined, for example, as the average values of the lengths and the diameters of 30 or more carbon nanotubes 18, respectively, by taking the electron micrograph of each carbon nanotube 18.

In the present embodiment, at least a part of the surface of the carbon nanotube 18 is coated with a material including an element with a lower electronegativity than that of carbon. In other words, the carbon nanotube 18 has a coating (not shown) of a material including an element with a lower electronegativity than that of carbon on at least a part of the surface thereof.

The elements with a lower electronegativity than that of carbon are desirably B, P, and a metal element.

Specific examples of the element with a lower electronegativity than that of carbon may include Ti (1.54), P (2.19), B (2.04), Si (1.90), Al (1.61), Zn (1.65), and W (2.36). Out of these, at least one selected from the group consisting of Ti, P, B, Si, Al, Zn, and W is desirable because of their particularly high resistance characteristics improving effects. It should be noted that the numerals indicated together with the symbol of element means values of the electronegativity of the element.

A smaller electronegativity of the element tends to provide a larger resistance reducing effect. For this reason, the electronegativity of the element is desirably 2.4 or lower, more desirably 2.0 or lower, and further desirably 1.8 or lower.

The material including an element with a lower electronegativity than that of carbon may include only one element with a lower electronegativity than that of carbon, or may include two or more thereof. When the material includes two or more elements, non-homogeneity occurs in the distribution of the elements in the coating film, which may improve the characteristics.

The material including an element with a lower electronegativity than that of carbon may be composed of one element, or may be composed of two or more elements.

The material including an element with a lower electronegativity than that of carbon may include an element with a higher electronegativity than that of carbon within the range not to impair the effects of the present teaching.

Examples of the element with a higher electronegativity than that of carbon may include O (3.44).

Accordingly, for example, the material including an element with a lower electronegativity than that of carbon may be an oxide of an element with a lower electronegativity than that of carbon. In this case, the element with a lower electronegativity than that of carbon becomes less likely to be eluted from a coating, resulting in an improvement of the durability of the coating.

The coating may include a binder such as acrylic resin.

The active material layer 14 may include other components than the active material 16 and the carbon nanotube 18. Examples thereof may include a binder and a thickener.

As the binder, for example, various polymer materials such as polyvinylidene fluoride (PVdF), polytetrafluoroethylene (PTFE), polyethylene oxide (PEO), and styrene butadiene rubber (SBR) can be used.

As the thickener, for example, carboxymethyl cellulose (CMC) can be used.

The active material layer 14 may include conductive materials (e.g., carbon black such as acetylene black (AB)) except for the carbon nanotube 18 within the range not impairing the effect of the present teaching.

The coating ratio (i.e., coverage rate) of the surface of the carbon nanotube 18 with a material including an element with a lower electronegativity than that of carbon is not particularly restricted. When the coverage rate is too low, the resistance characteristics improving effect due to coating tends to be reduced. For this reason, the coverage rate is desirably 20% or more, more desirably 30% or more, and further desirably 40% or more. On the other hand, when the coverage rate is too high, the carbon nanotube 18 functioning as the conductive path may be insulated. For this reason, the coverage rate is desirably 90% or lower, more desirably 80% or lower, and further desirably 70% or lower. The coverage rate is most desirably 40% or more and 70% or lower because of the particularly high resistance reducing effect.

It should be noted that the coverage rate of the carbon nanotube 18 can be determined, for example, in the following manner. First, using an energy dispersion type X ray analysis device (EDS device), a cross-section EDS mapping image is acquired, and the element deposited at the carbon nanotube 18 is identified. Then, in the cross-section EDS mapping image, (total of the deposition distances of element(s))/(entire circumferential length of carbon nanotube 18)×100 is calculated. The calculated value can be referred to as a coverage rate (%). Alternatively, the coverage rate (%) can also be determined using an electron probe micro analyzer (EPMA) in the same manner.

The carbon nanotube 18 coated with a material including an element with a lower electronegativity than that of carbon on at least a part of the surface thereof can be manufactured, for example, in the following manner.

For example, mention may be made of a method in which vapor deposition is performed while rotating the carbon nanotube. With this method, the surface of the carbon nanotube can be coated with only an element with a low electronegativity.

Alternatively, for example, mention may be made of the following method: a dispersion of a material including an element with a lower electronegativity than that of carbon (particularly, an oxide of an element with a lower electronegativity than that of carbon) having a particle diameter of nano order is first prepared, a carbon nanotube is then immersed in the dispersion, and the dispersion medium of the dispersion is dried and removed. For the purpose of improving the strength of the coating, a binder such as an acrylic resin may be allowed to be contained in the dispersion.

In the present embodiment, the carbon nanotube 18 coated with a material including an element with a lower electronegativity than that of carbon on at least a part of the surface thereof is used as a conductive material of the active material layer 14. This can provide an electrode 10 excellent in resistance characteristics. Specifically, the electrode 10 in accordance with present embodiment has an effect of a small initial battery resistance. In addition, the electrode 10 has an effect of being largely suppressed in increase in battery resistance even after high-temperature storage.

The reason for this is presumed as follows.

When the carbon nanotube 18 has a coating of a material including an element with a lower electronegativity than that of carbon, the surface of the coating is positively charged, and attracts electrons. As a result, the electron conductivity of the carbon nanotube 18 is improved, and the battery resistance is reduced. Further, the surface of the coating becomes basic, and traps the acid (e.g., HF) generated by decomposition of a non-aqueous electrolytic solution, or the like. This suppresses the increase in battery resistance during high-temperature storage by the acid.

The content of the active material 16 is not particularly restricted, but is desirably 75 mass % or more, more desirably 80 mass % or more, and further desirably 85 mass % or more in the active material layer 14 (i.e., based on the total mass of the active material layer 14). Meanwhile, the content of the active material is desirably 99.8 mass % or lower, more desirably 99.5 mass % or lower, and further desirably 99 mass % or lower in the active material layer 14.

The content of the carbon nanotube 18 is not particularly restricted, and is desirably 0.1 mass % or more, more desirably 0.3 mass % or more, and further desirably 0.5 mass % or more in the active material layer 14. Meanwhile, the content of the carbon nanotube 18 is desirably 15 mass % or lower, more desirably 10 mass % or lower, and further desirably 5 mass % or lower in the active material layer 14.

The content of the binder is not particularly restricted, and is desirably 0.1 mass % or more and 10 mass % or lower, and more desirably 0.5 mass % or more and 8 mass % or lower in the active material layer 14.

The content of the thickener is not particularly restricted, and is desirably 0.1 mass % or more and 5 mass % or lower, and more desirably 0.5 mass % or more and 3 mass % or lower in the active material layer 14.

The electrode 10 in accordance with the present embodiment is for a secondary battery, desirably for a non-aqueous electrolytic solution secondary battery, and particularly desirably for a lithium ion secondary battery. In accordance with a known method, using the electrode 10 in accordance with the present embodiment, a secondary battery (particularly, a non-aqueous electrolytic solution secondary battery) can be constructed. The secondary battery is excellent in resistance characteristics. Specifically, the secondary battery has a small initial resistance, and is excellent in input output characteristics. Further, the secondary battery is suppressed in increase in resistance after high-temperature storage, and hence is excellent in durability. Thus, a specific configuration example of a lithium ion secondary battery using the electrode 10 in accordance with the present embodiment will be described hereinafter with reference to the accompanying drawings.

Figure 2:
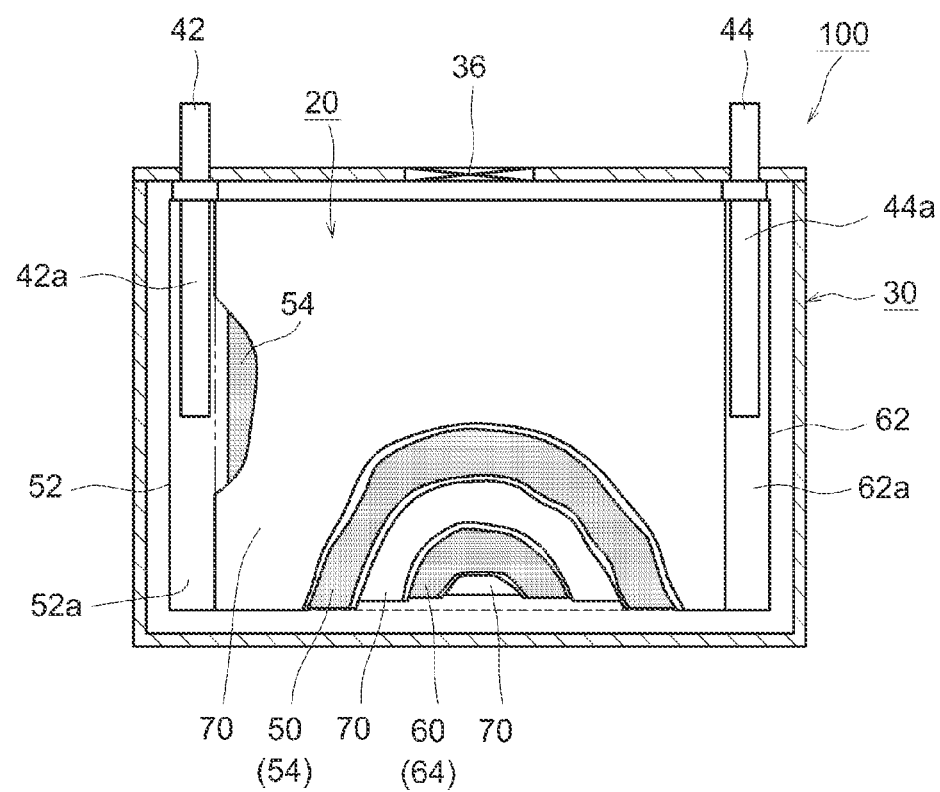
FIG. 2 is a cross sectional view schematically showing a configuration of a lithium ion secondary battery constructed using an electrode in accordance with one embodiment of the present teaching.

A lithium ion secondary battery 100 shown in FIG. 2 is a sealed type battery constructed by accommodating a flat-shaped wound electrode body 20 and a non-aqueous electrolyte (not shown) in a flat square battery case (i.e., an exterior container) 30. The battery case 30 is provided with a positive electrode terminal 42 and a negative electrode terminal 44 for external connection, and a thin-walled safety valve 36 set so as to relieve the internal pressure when the internal pressure of the battery case 30 increases to a prescribed level or higher. The positive and negative electrode terminals 42 and 44 are electrically connected with positive and negative electrode collector plates 42a and 44a, respectively. As the material for the battery case 30, for example, a metal material which is lightweight, and has a good thermal conductivity such as aluminum is used.

Figure 3:
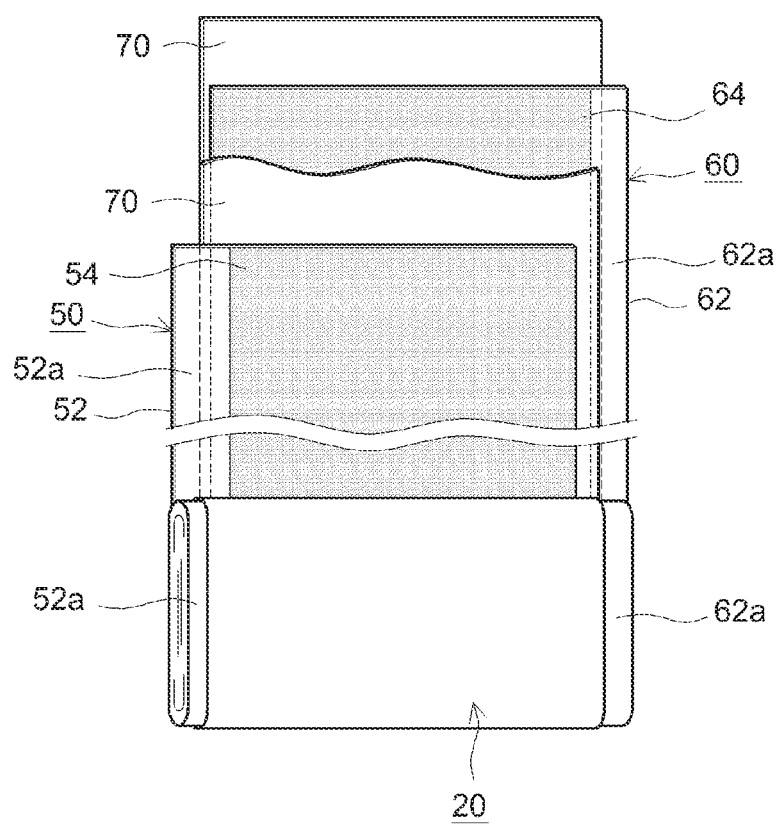
FIG. 3 is a schematic view showing a configuration of a wound electrode body of a lithium ion secondary battery constructed using an electrode in accordance with one embodiment of the present teaching.

For the wound electrode body 20, as shown in FIGS. 2 and 3, a positive electrode sheet 50 includes a positive electrode active material layer 54 formed along the longitudinal direction on one surface or both surfaces (both surfaces in this case) of a long-length positive electrode collector 52; and a negative electrode sheet 60 includes a negative electrode active material layer 64 formed along the longitudinal direction on one surface or both surfaces (both surface in this case) of a long-length negative electrode collector 62. The positive electrode sheet 50 and the negative electrode sheet 60 are stacked and wound in the longitudinal direction with two long-length separator sheets 70 interposed therebetween. It should be noted that a positive electrode collector plate 42a and a negative electrode collector plate 44a are bonded to a positive electrode active material layer non-formation part 52a (i.e., the portion of the positive electrode collector 52 exposed without formation of the positive electrode active material layer 54 thereon), and a negative electrode active material layer non-formation part 62a (i.e., the portion of the negative electrode collector 62 exposed without formation of the negative electrode active material layer 64 thereon) that are formed so as to extend off outwardly from both ends in the winding axial direction (denoting the sheet width direction orthogonal to the longitudinal direction) of the wound electrode body 20, respectively.

For each of the positive electrode sheet 50 and the negative electrode sheet 60, the electrode 10 in accordance with the present embodiment is used.

In the present example, for the positive electrode sheet 50, aluminum foil is used as the positive electrode collector 52, and the positive electrode active material layer 54 includes a positive electrode active material, a carbon nanotube, and a binder. The carbon nanotube has the coating mentioned above.

In the present example, for the negative electrode sheet 60, copper foil is used as the negative electrode collector 62, and the negative electrode active material layer 64 includes graphite of a negative electrode active material, a carbon nanotube, a binder, and a thickener. The carbon nanotube has the coating mentioned above.

It should be noted that, in the present example, for both the positive electrode sheet 50 and the negative electrode sheet 60, the electrodes 10 in accordance with the present embodiment are used. As for the lithium ion secondary battery 100, the electrode 10 in accordance with the present embodiment may be used for only one of the positive electrode sheet 50 and the negative electrode sheet 60. However, use of the electrodes 10 in accordance with the present embodiment for both the positive electrode sheet 50 and the negative electrode sheet 60 can provide a larger resistance characteristics improving effect.

As the separators 70, the same various microporous sheets as those conventionally used for a lithium ion secondary battery can be used, and examples thereof may include a microporous resin sheet formed of a resin such as polyethylene (PE) or polypropylene (PP). Such a microporous resin sheet may be of a monolayer structure, or may be a multi-layered structure of double layer or more (e.g., a three-layered structure in which PP layers are stacked on both surfaces of a PE layer). The separator 70 may include a heat resistant layer (HRL).

As the non-aqueous electrolytic solution, the same ones as those for a conventional lithium ion secondary battery are usable. Typically, the one obtained by allowing an organic solvent (non-aqueous solvent) to include a support salt is usable. As the non-aqueous solvents, various organic solvents such as carbonates, ethers, esters, nitriles, sulfones, and lactones for use in the electrolytic solution of a general lithium ion secondary battery can be used without particular restriction. Specific examples thereof may include ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), and trifluoro dimethyl carbonate (TFDMC). Such non-aqueous solvents may be used alone, or in appropriate combination of two or more thereof. As the support salt, for example, lithium salt such as $LiPF_6$, $LiBF_4$, or $LiClO_4$ (desirably $LiPF_6$) can be desirably used. The concentration of the support salt is desirably 0.7 mol/L or more and 1.3 mol/L or lower.

It should be noted that the non-aqueous electrolytic solution may include, for example, various additives of gas generator such as biphenyl (BP) or cyclohexyl benzene (CHB); film forming agent such as oxalato complex compound including a boron atom and/or phosphorus atom or vinylene carbonate (VC); dispersant; thickener; and other additives so long as the effects of the present teaching is not remarkably impaired.

The lithium ion secondary battery 100 is usable for various uses. The desirable uses may include a driving power source to be mounted in a vehicle such as a plug-in hybrid vehicle (PHV), a hybrid vehicle (HV), or an electric vehicle (EV). The lithium ion secondary batteries 100 can be used in a form of a battery back in which a plurality thereof are electrically connected with one another.

It should be noted that, as one example, the rectangular lithium ion secondary battery 100 including the flat-shaped wound electrode body 20 was described. However, a lithium ion secondary battery can also be configured as a lithium ion secondary battery including a stacked type electrode body. Alternatively, a lithium ion secondary battery can also be configured as a cylindrical lithium ion secondary battery, a laminate type lithium ion battery, or the like.

Alternatively, according to a known method, using the electrode 10 in accordance with the present embodiment, other secondary batteries (particularly, a non-aqueous electrolytic solution secondary battery) other than a lithium ion secondary battery can also be configured.

Examples regarding the present teaching will be described in details hereinafter. However, it is not intended that the present teaching is limited to such examples.

Manufacturing of Coated Carbon Nanotube

A dispersion of an oxide of the element shown in Table 1 (e.g., titanium oxide in the case of Ti) was prepared. To the dispersion, a small amount of acrylic resin was dissolved as a binder. Into the dispersion, a carbon nanotube having the average length shown in Table 1, and manufactured by a chemical vapor deposition method was immersed. Subsequently, evaporation to dryness was performed, resulting in a carbon nanotube coated with an oxide of the element shown in Table 1. It has been indicated by cross-section EDS mapping that the element shown in Table 1 coats the carbon nanotube. Further, the coverage rate was calculated from (total of deposition distances of element(s))/(entire circumferential length of carbon nanotube)×100. The results are shown in Table 1.

Study of Positive Electrode: Examples 1 to 16 and Comparative Example 1

Manufacturing of Positive Electrode $LiNi_{1/3}Co_{1/3}Mn_{1/3}O_2$ (LNCM) as a positive electrode active material powder, acetylene black (AB) as a conductive material, the manufactured coated carbon nanotube (CN), and polyvinylidene fluoride (PVDF) as a binder were mixed with N-methyl pyrrolidone (NMP) at a mass ratio of LNCM:AB:CN:PVDF=94:1.5:1.5:3, thereby preparing a positive electrode active material layer forming paste. The paste was coated in a band shape on both surfaces of aluminum foil with a thickness of 15 µm, and was dried and subjected to a press treatment, thereby manufacturing a positive electrode.

Manufacturing of Battery for Evaluation

Spheroidized graphite (C) as a negative electrode active material, CMC as a thickener, and SBR as a binder were mixed with ion exchanged water at a mass ratio of C:CMC:SBR=98:1:1, thereby preparing a negative electrode active material layer forming paste. The paste was coated in a band shape on both surfaces of copper foil with a thickness of 10 µm, and was dried and subjected to a press treatment, thereby manufacturing a negative electrode.

Further, two separators (porous polyolefine sheets of a three-layered structure of PP/PE/PP with a thickness of 20 µm) were prepared.

The manufactured positive electrode and negative electrode, and separators were laminated so that the separators were interposed between the positive and negative electrodes, and the resultant laminate was wound. Thus, a wound electrode body was obtained.

The manufactured wound electrode body was accommodated in a battery case. Subsequently, a non-aqueous electrolytic solution was injected into the battery case, thereby manufacturing a rectangular lithium ion secondary battery with a capacity of 5 Ah. It should be noted that, for the non-aqueous electrolytic solution, there was used the one obtained by dissolving $LiPF_6$ as a support salt at a concentration of 1.0 mol/L in a mixed solvent including ethylene carbonate (EC), dimethyl carbonate (DMC), and ethyl methyl carbonate (EMC) at a volume ratio of EC:DMC:EMC=3:4:3.

In the manner as described above, lithium ion secondary batteries for evaluation using electrodes of Examples 1 to 16 were obtained.

Meanwhile, a lithium ion secondary battery for evaluation using the electrode of Comparative Example 1 was obtained in the same manner as described above, except for using a carbon nanotube as it was (i.e., using an uncoated carbon nanotube).

Study of Negative Electrode: Examples 17 to 19 and Comparative Examples 2 to 4

Manufacturing of Negative Electrode

The negative electrode active material (NA) shown in Table 1, the manufactured coated carbon nanotube (CN), CMC as a thickener, and SBR as a binder were mixed with ion exchanged water at a mass ratio of NA:CN:CMC:SBR=96.5:1.5:1:1, thereby preparing a negative electrode active material layer forming paste. The paste was coated in a band shape on both surfaces of copper foil with a thickness of 10 µm, and was dried and subjected to a press treatment, thereby manufacturing a negative electrode.

Manufacturing of Battery for Evaluation $LiNi_{1/3}Co_{1/3}Mn_{1/3}O_2$ (LNCM) as a positive electrode active material powder, acetylene black (AB) as a conductive material, and polyvinylidene fluoride (PVDF) as a binder were mixed with N-methyl pyrrolidone (NMP) at a mass ratio of LNCM:AB:PVDF=94:3:3, thereby preparing a positive electrode active material layer forming paste. The paste was coated in a band shape on both surfaces of aluminum foil with a thickness of 15 µm, and was dried and subjected to a press treatment, thereby manufacturing a positive electrode.

Further, two separators (porous polyolefine sheets of a three-layered structure of PP/PE/PP with a thickness of 20 µm) were prepared.

The manufactured positive electrode and negative electrode, and separators were laminated so that the separators were interposed between the positive and negative electrodes, and the resultant laminate was wound. Thus, a wound electrode body was obtained.

The manufactured wound electrode body was accommodated in a battery case. Subsequently, a non-aqueous electrolytic solution was injected into the battery case, thereby manufacturing a rectangular lithium ion secondary battery with a capacity of 5 Ah. It should be noted that, for the non-aqueous electrolytic solution, there was used the one obtained by dissolving $LiPF_6$ as a support salt at a concentration of 1.0 mol/L in a mixed solvent including ethylene carbonate (EC), dimethyl carbonate (DMC), and ethyl methyl carbonate (EMC) at a volume ratio of EC:DMC:EMC=3:4:3.

In the manner as described above, lithium ion secondary batteries for evaluation using electrodes of Examples 17 to 19 were obtained.

Meanwhile, lithium ion secondary batteries for evaluation using the electrodes of Comparative Examples 2 to 4 were obtained in the same manner as described above, except for using a carbon nanotube as it was (i.e., using an uncoated carbon nanotube).

Initial Resistance Evaluation

Each lithium ion secondary battery for evaluation was adjusted to a state of charge (SOC) of 50%, and then, was allowed to stand under 25° C. environment. At a current value of 100 Ah, 10-second discharging was performed. The voltage value after 10 seconds from start of discharging was measured, and the initial battery resistance was calculated. The ratio of each resistance of other lithium ion secondary batteries for evaluation when the resistance of the lithium ion secondary battery for evaluation of Comparative Example 1 was taken as 100 was determined (i.e., the ratio was determined in terms of percentage). The results are shown in Table 1.

Evaluation of Resistance after High-temperature Storage

Each lithium ion secondary battery for evaluation was adjusted to a SOC of 100%, and was stored under 60° C. environment for 30 days. Then, the battery resistance was measured in the same manner as described above. The ratio of each resistance of other lithium ion secondary batteries for evaluation when the resistance of the lithium ion secondary battery for evaluation of Comparative Example 1 was taken as 100 was determined (i.e., the ratio was determined in terms of percentage). The results are shown in Table 1.

TABLE 1

| | CN containing electrode (active material) | CN-coated element (electro-negativity) | CN average length (μm) | Coverage rate (%) | Initial resistance ratio (%) | Resistance ratio after high-temperature storage (%) |
|---|---|---|---|---|---|---|
| Ex. 1 | Positive electrode (LNCM) | Ti (1.54) | 10 | 50 | 70 | 75 |
| Ex. 2 | | P (2.19) | | | 77 | 80 |
| Ex. 3 | | B (2.04) | | | 75 | 75 |
| Ex. 4 | | Si (1.90) | | | 75 | 85 |
| Ex. 5 | | Al (1.61) | | | 73 | 85 |
| Ex. 6 | | Zn (1.65) | | | 73 | 80 |
| Ex. 7 | | W (2.36) | | | 80 | 85 |
| Ex. 8 | | Ti (1.54) | 1 | | 85 | 90 |
| Ex. 9 | | | 3 | | 75 | 87 |
| Ex. 10 | | | 50 | | 72 | 74 |
| Ex. 11 | | | 100 | | 85 | 90 |
| Ex. 12 | | | 10 | 30 | 85 | 80 |
| Ex. 13 | | | | 40 | 75 | 77 |
| Ex. 14 | | | | 70 | 75 | 74 |
| Ex. 15 | | | | 80 | 85 | 72 |
| Ex. 16 | | Ti (1.54), P (2.19) | | 50 | 73 | 77 |
| Comp. Ex. 1 | | Without coating | | | 100 | 100 |
| Ex. 17 | Negative electrode (graphite) | Ti (1.54) | 10 | 50 | 108 | 75 |
| Comp. Ex. 2 | | Without coating | | | 110 | 100 |
| Ex. 18 | Negative electrode (LTO) | Ti (1.54) | 10 | 50 | 75 | 70 |
| Comp. Ex. 3 | | Without coating | | | 115 | 95 |
| Ex. 19 | Negative electrode (Si) | Ti (1.54) | 10 | 50 | 80 | 80 |
| Comp. Ex. 4 | | Without coating | | | 120 | 105 |

Ex.: Example
Comp. Ex.: Comparative example

The results of Examples 1 to 7 and Comparative Example 1 indicate that use of a carbon nanotube coated with a material including an element with a lower electronegativity than that of carbon reduces the initial resistance, and also suppresses the increase in resistance after high-temperature storage.

Results of Example 1 and Examples 8 to 11 indicate that when the average length of carbon nanotubes is 3 μm or more and 50 μm or less, the resistance characteristics improving effect is particularly high. This is considered due to the following: when the length of the carbon nanotube is reduced, the conductive path tends to become less likely to be formed; and an increase in length of the carbon nanotube causes aggregation of the carbon nanotubes, so that the resistance reducing effect tends to be reduced.

The results of Example 1 and Examples 12 to 15 indicate that when the coverage rate is 40% or more and 70% or lower, the resistance characteristics improving effect is particularly high. This is considered due to the following: a decrease in coverage rate tends to reduce the resistance characteristics improving effect due to coating; and an increase in coverage rate increases the influence of insulating the point of contact between the active material and the carbon nanotube.

The results of Example 16 indicate that even when the material for coating the carbon nanotube included a plurality of elements with a lower electronegativity than that of carbon, the resistance characteristics improving effect was observed.

The results of Examples 17 to 19 and Comparative Examples 2 to 4 indicates that even when a carbon nanotube coated with a material including an element with a lower electronegativity than that of carbon was used for the negative electrode, the initial resistance was reduced, and the increase in resistance after high-temperature storage was suppressed. When the negative electrode active materials were LTO and Si, the initial resistance reducing effect was large. In contrast, when graphite was used for the negative electrode active material, the degree of reduction of the initial resistance was small. This is considered due to the fact that the electron conductivity of graphite was sufficiently high, and the room for improvement of the electron conductivity was small.

Up to this point, specific examples of the present teaching were described in details. However, these are merely examples, and do not limit the scope of the appended claims. The technology described in the appended claims includes various modifications and changes of the specific examples exemplified up to this point.

What is claimed is:

1. An electrode for a secondary battery, comprising:
    a collector; and
    an active material layer formed on the collector,
    wherein the active material layer includes a mixture of an active material and carbon nanotubes,
    an average length of the carbon nanotubes is 3 μm or more and 50 μm or less,
    at least a part of a surface of each of the carbon nanotubes is coated with a coating material including an element with a lower electronegativity than that of carbon,
    a coating ratio of the surface of each of the carbon nanotubes with the material including an element with a lower electronegativity than that of carbon is 40% or more and 70% or lower,
    the electrode for the secondary battery is a negative electrode,
    the active material is $Li_4Ti_5O_{12}$ or Si, an average diameter of the carbon nanotubes is 0.1 nm or more and 30 nm or less, a content of the carbon nanotubes is 0.1 mass % or more and 15 mass % or lower in the active material layer when a total mass of the active material layer is considered to be 100 mass %, and the carbon nanotubes are dispersed in the active material of the active material layer.

2. The electrode for a secondary battery according to claim 1, wherein the element with a lower electronegativity than that of carbon is at least one selected from the group consisting of Ti, P, B, Si, Al, Zn, and W.

3. The electrode for a secondary battery according to claim 1, wherein the material including an element with a lower electronegativity than that of carbon is an oxide of the element with a lower electronegativity than that of carbon.

4. A secondary battery comprising the electrode for a secondary battery according to claim 1.

\* \* \* \* \*